United States Patent
Choi et al.

(10) Patent No.: US 12,494,540 B2
(45) Date of Patent: Dec. 9, 2025

(54) BATTERY MODULE, BATTERY PACK COMPRISING SAME, AND VEHICLE

(71) Applicant: LG ENERGY SOLUTION, LTD., Seoul (KR)

(72) Inventors: Bum Choi, Daejeon (KR); Jong-Yoon Keum, Daejeon (KR); Jong-Chul Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 754 days.

(21) Appl. No.: 17/776,878

(22) PCT Filed: May 14, 2021

(86) PCT No.: PCT/KR2021/006102
§ 371 (c)(1),
(2) Date: May 13, 2022

(87) PCT Pub. No.: WO2021/235783
PCT Pub. Date: Nov. 25, 2021

(65) Prior Publication Data
US 2022/0344759 A1    Oct. 27, 2022

(30) Foreign Application Priority Data
May 19, 2020  (KR) .......................... 10-2020-0059726

(51) Int. Cl.
*H01M 50/242*    (2021.01)
*B60L 50/64*    (2019.01)
(Continued)

(52) U.S. Cl.
CPC .......... *H01M 50/242* (2021.01); *B60L 50/64* (2019.02); *H01M 50/213* (2021.01); *H01M 50/249* (2021.01); *H01M 2220/20* (2013.01)

(58) Field of Classification Search
CPC ............. H01M 50/242; H01M 50/249; H01M 50/213; H01M 50/289; H01M 50/291; H01M 2220/20; B60L 50/64
See application file for complete search history.

(56) References Cited

U.S. PATENT DOCUMENTS

| 6,400,122 B1 | 6/2002 | Wamura |
| 2004/0069620 A1 | 4/2004 | Bitsche et al. |

(Continued)

FOREIGN PATENT DOCUMENTS

| CN | 101573809 A | 11/2009 |
| CN | 101834285 A | 9/2010 |

(Continued)

OTHER PUBLICATIONS

Extended European Search Report issued in corresponding European Patent Application No. 21809712.9, dated May 25, 2023. Note US 2011/0223452 cited therein is already of record.

(Continued)

*Primary Examiner* — Christopher P Domone
(74) *Attorney, Agent, or Firm* — Morgan, Lewis & Bockius LLP (57) ABSTRACT

Disclosed is a battery module having a reinforcement member to reinforce the mechanical strength of a module case. To achieve the above-described object, the battery module according to the present disclosure includes a plurality of secondary batteries arranged in at least one direction, a module case including a cover portion, a bottom portion, and a side portion to define an internal space in which the plurality of secondary batteries is disposed, and a reinforcement member disposed in the module case and fixed to a lower surface of the cover portion and an upper surface of the bottom portion.

8 Claims, 6 Drawing Sheets

(51) Int. Cl.
H01M 50/213 (2021.01)
H01M 50/249 (2021.01)

(56) References Cited

U.S. PATENT DOCUMENTS

| | | | |
|---|---|---|---|
| 2008/0057393 A1 | 3/2008 | Onuki et al. | |
| 2008/0311468 A1 | 12/2008 | Hermann et al. | |
| 2009/0061294 A1 | 3/2009 | Ahn | |
| 2010/0119931 A1 | 5/2010 | Shishido et al. | |
| 2011/0223452 A1 | 9/2011 | Yoshida et al. | |
| 2011/0287287 A1* | 11/2011 | Kang | H01M 10/643 |
| | | | 429/82 |
| 2014/0315070 A1 | 10/2014 | Park et al. | |
| 2017/0222199 A1* | 8/2017 | Idikurt | H01M 50/291 |
| 2017/0229689 A1 | 8/2017 | Fujiwara | |
| 2017/0320381 A1 | 11/2017 | Milton et al. | |
| 2018/0331402 A1 | 11/2018 | Inoue | |
| 2019/0131602 A1 | 5/2019 | Hilfrich et al. | |
| 2019/0372069 A1 | 12/2019 | Lee et al. | |
| 2020/0194853 A1 | 6/2020 | Yoo et al. | |
| 2022/0407110 A1* | 12/2022 | Ge | H01M 10/4235 |
| 2023/0044305 A1* | 2/2023 | Choi | H01M 10/613 |

FOREIGN PATENT DOCUMENTS

| | | |
|---|---|---|
| CN | 206893662 U | 1/2018 |
| CN | 107878172 A | 4/2018 |
| CN | 109219899 A | 1/2019 |
| CN | 210142675 U | 3/2020 |
| EP | 2393141 A2 | 12/2011 |
| EP | 3565025 A1 | 11/2019 |
| JP | H09-306447 A | 11/1997 |
| JP | H11-45691 A | 2/1999 |
| JP | 2001-110379 A | 4/2001 |
| JP | 2003-059470 A | 2/2003 |
| JP | 2003-257394 A | 9/2003 |
| JP | 2004-504702 A | 2/2004 |
| JP | 2008-123846 A | 5/2008 |
| JP | 2008-166209 A | 7/2008 |
| JP | 2009-059681 A | 3/2009 |
| JP | 2010-528406 A | 8/2010 |
| JP | 2011-175896 A | 9/2011 |
| JP | 2013-089560 A | 5/2013 |
| JP | 2014-212112 A | 11/2014 |
| JP | 2015-022849 A | 2/2015 |
| JP | 2015-156320 A | 8/2015 |
| JP | 2016-225031 A | 12/2016 |
| JP | 2017-027736 A | 2/2017 |
| JP | 2018-190660 A | 11/2018 |
| JP | 2019-519883 A | 7/2019 |
| KR | 10-2007-0117334 A | 12/2007 |
| KR | 10-2010-0088030 A | 8/2010 |
| KR | 10-2019-0032887 A | 3/2019 |
| KR | 10-2019-0047499 A | 5/2019 |
| KR | 10-2069510 B1 | 1/2020 |
| KR | 10-2069511 B1 | 1/2020 |
| WO | 2015/008750 A1 | 1/2015 |

OTHER PUBLICATIONS

International Search Report (with partial translation) and Written Opinion dated Aug. 20, 2021, for corresponding International Patent Application No. PCT/KR2021/006102.
Japanese Office Action issued in corresponding JP Application No. 2022-526802 dated Jun. 5, 2023.
Office Action issued Sep. 1, 2023 for corresponding Chinese Patent Application No. 202180006756.5, Citation: CN 210142675 U, US 2011/0223452 A1 & CN 206893662 U are of record.

* cited by examiner

BATTERY MODULE, BATTERY PACK COMPRISING SAME, AND VEHICLE

TECHNICAL FIELD

The present disclosure relates to a battery module, a battery pack comprising the same and a vehicle, and more particularly, to a battery module having a reinforcement member to reinforce the mechanical strength of a module case.

The present application claims the benefit of Korean Patent Application No. 10-2020-0059726 filed on May 19, 2020 with the Korean Intellectual Property Office, the disclosure of which is incorporated herein by reference in its entirety.

BACKGROUND ART

Recently, with the rapid increase in demand for portable electronic products such as laptop computers, video cameras and mobile phones and the extensive development of electric vehicles, accumulators for energy storage, robots and satellites, many studies are being made on high performance secondary batteries that can be repeatedly recharged.

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages that recharging can be done whenever it is convenient, the self-discharge rate is very low and the energy density is high.

A lithium secondary battery primarily uses a lithium-based oxide and a carbon material as a positive electrode active material and a negative electrode active material respectively. Additionally, the lithium secondary battery includes an electrode assembly including a positive electrode plate and a negative electrode plate coated with the positive electrode active material and the negative electrode active material respectively with a separator interposed between the positive electrode plate and the negative electrode plate, and a packaging or a battery case in which the electrode assembly is hermetically received together with an electrolyte solution.

Additionally, lithium secondary batteries may be classified into can-type secondary batteries including the electrode assembly embedded in a metal can and pouch-type secondary batteries including the electrode assembly embedded in a pouch of an aluminum laminate sheet according to the shape of the packaging.

Among them, the can-type secondary battery may have the cylindrical metal can in which the electrode assembly is received. The can-type secondary battery may be used to manufacture a battery module including a module case to accommodate a plurality of secondary batteries and a busbar configured to electrically connect the plurality of secondary batteries.

Additionally, the plurality of secondary batteries may be embedded in the module case. In this instance, when the module case is made of an electrically insulating plastic material, in many cases, due to vibration or external impacts, vertical vibration occurs in the central part of the module case, or deformation (swelling) such as upward or downward bending occurs in the central part of the module case. When vibration or bending repeatedly occurs in the module case, damage or cracks may occur in the central part of the module case, resulting in degraded durability of the battery module.

In particular, when the battery module includes the plurality of secondary batteries, larger deformation occurs in the central part of the module case by the weight of the plurality of secondary batteries, which makes the problem worse.

Further, when the outermost area of the module case of the battery module is fixed using bolts, the central part of the module case is fixed weaker, causing larger deformation of the central part, which makes the deformation problem of the battery module worse.

DISCLOSURE

Technical Problem

The present disclosure is designed to solve the above-described problem, and therefore the present disclosure is directed to providing a battery module having a reinforcement member to reinforce the mechanical strength of a module case.

These and other objects and advantages of the present disclosure may be understood by the following description, and will be apparent from the embodiments of the present disclosure. In addition, it will be readily appreciated that the objects and advantages of the present disclosure may be realized by means and combinations thereof.

Technical Solution

To achieve the above-described object, a battery module according to the present disclosure includes a plurality of secondary batteries arranged in at least one direction, a module case including a cover portion, a bottom portion and a side portion to form an internal space in which the plurality of secondary batteries is mounted, and a reinforcement member disposed in the module case and fixed to a lower surface of the cover portion and an upper surface of the bottom portion.

Additionally, the battery module may further include an adhesive member configured to fix the reinforcement member to at least one of the lower surface of the cover portion of the module case, the upper surface of the bottom portion or an inner surface of the side portion.

Furthermore, the plurality of secondary batteries may be spaced a predetermined distance apart from each other, the reinforcement member may have a plate shape extending in a horizontal direction along the side portion of the plurality of secondary batteries, and at least part of the reinforcement member may have a curved shape protruding toward a spacing of the plurality of secondary batteries.

Additionally, the adhesive member may include a protrusion filled in the spacing of the plurality of secondary batteries.

Additionally, the reinforcement member may include a body portion extending in a direction, and a bent portion bent in contact with an inner side surface of the module case at each of two ends of the body portion and attached to the inner side surface of the module case by the adhesive member.

Further, the reinforcement member may include a receiving groove recessed in an inward direction at a part of the body portion, in which the adhesive member is filled, and a coupling hole which is open at a part of the bent portion to accommodate the adhesive member.

Additionally, the reinforcement member may include a pair of plates extending in a direction and spaced a predetermined apart from each other to form an internal space, and the adhesive member may be filled in between the pair of plates.

Additionally, each of the pair of plates may have an opening configured such that the internal space between the pair of plates is in communication with outside.

Additionally, to achieve the above-described object, a battery pack according to the present disclosure includes at least one battery module.

Additionally, to achieve the above-described object, a vehicle according to the present disclosure includes the battery pack.

Advantageous Effects

According to an aspect of the present disclosure, the present disclosure includes the reinforcement member disposed in the module case and fixed to the lower surface of the cover portion and the upper surface of the bottom portion, thereby effectively preventing deformation of the module case caused by vibration or external impacts. That is, the reinforcement member may fix the lower surface of the cover portion of the module case and the upper surface of the bottom portion, thereby preventing vertical deformation of the cover portion and the bottom portion of the module case. Accordingly, it is possible to reduce damage caused by frequent deformation of the module case and prevent damage of the plurality of secondary batteries mounted in the module case or the internal components caused by vibration or the external impacts.

Further, since the module case of the present disclosure is not mechanically weak at the central part, it is easy to realize a large capacity battery module including the plurality of secondary batteries. Accordingly, it is possible to increase the energy density of the battery module, and reduce the number of components, thereby saving the manufacturing costs.

BRIEF DESCRIPTION OF THE DRAWINGS

The accompanying drawings illustrate the preferred embodiments of the present disclosure, and together with the following detailed description, serve to provide a further understanding of the technical aspect of the present disclosure. However, the present disclosure should not be construed as being limited to the drawings.

DETAILED DESCRIPTION

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and the illustrations shown in the drawings are just a most preferred embodiment of the present disclosure, but not intended to fully describe the technical aspects of the present disclosure, so it should be understood that a variety of other equivalents and modifications could have been made thereto at the time that the application was filed.

Figure 1:
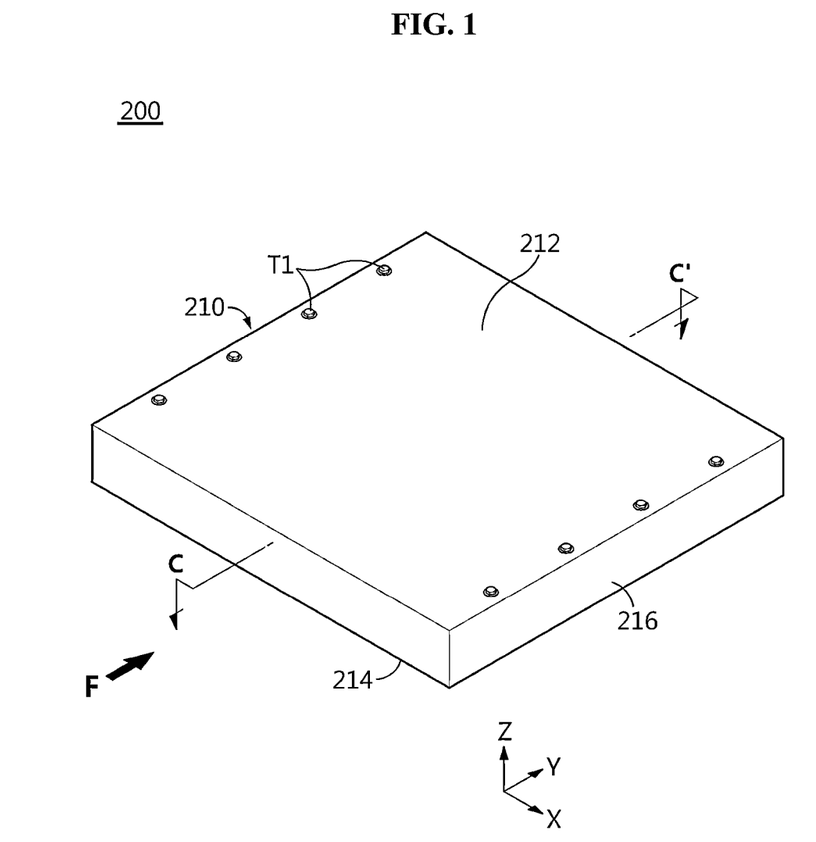
FIG. 1 is a schematic perspective view of a battery module according to an embodiment of the present disclosure.

FIG. 1 is a schematic perspective view of a battery module according to an embodiment of the present disclosure. Additionally, FIG. 2 is a schematic exploded perspective view of the components of the battery module according to an embodiment of the present disclosure.

Figure 2:
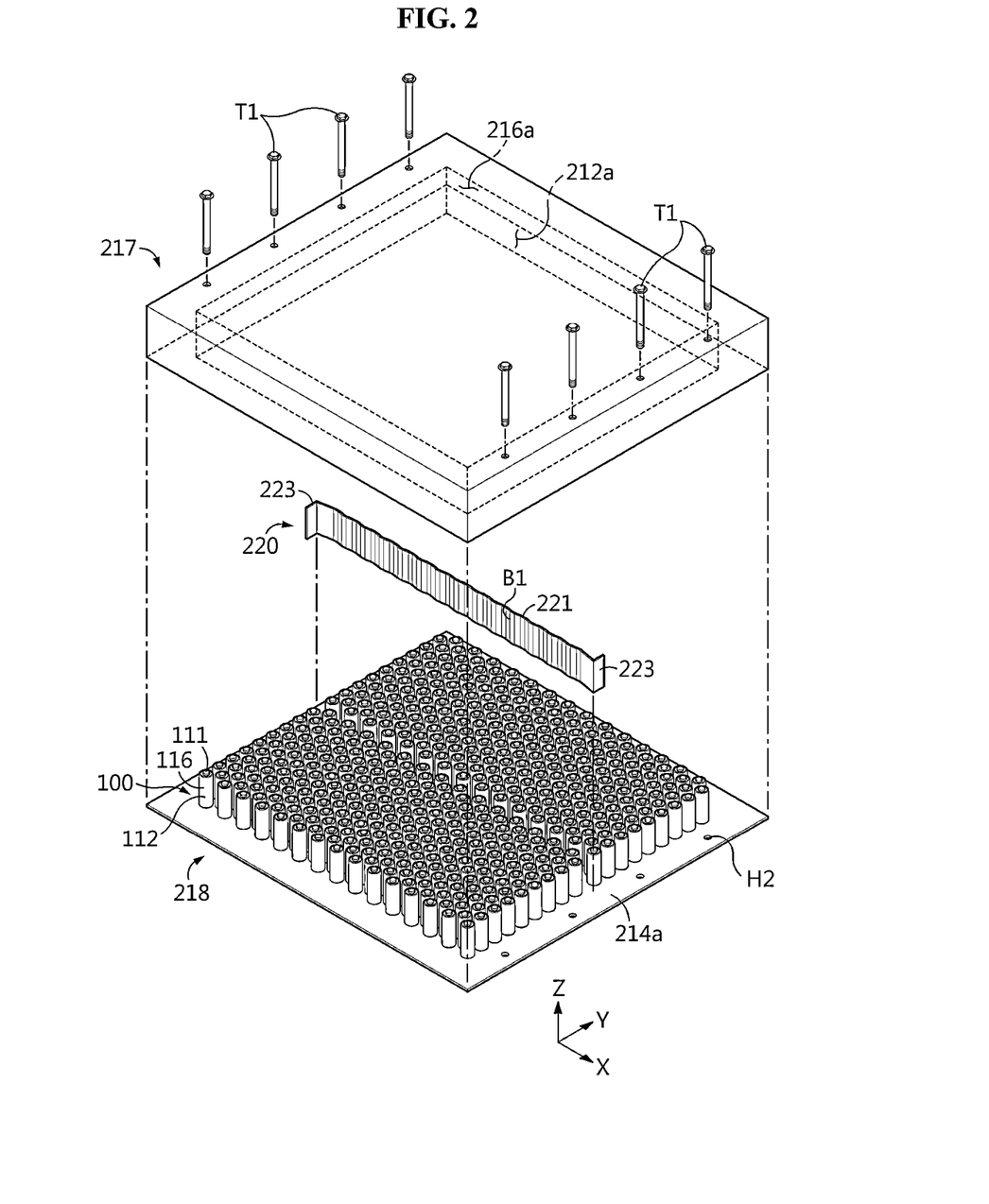
FIG. 2 is a schematic exploded perspective view of components of a battery module according to an embodiment of the present disclosure.

Referring to FIGS. 1 and 2, the battery module 200 of the present disclosure includes a plurality of secondary batteries 100, a module case 210 and a reinforcement member 220.

Specifically, the plurality of secondary batteries 100 may be a cylindrical battery cell. Here, the cylindrical battery cell may include a battery can 116 and a negative electrode terminal 112 in the body of the battery can 116, and a positive electrode terminal 111 in a battery cap coupled to the top of the battery can 116. The cylindrical battery cell may include an electrode assembly (not shown) received in the battery can 116. The configuration of the cylindrical battery cell is well-known to those skilled in the art at the time of filing the patent application, and its detailed description is omitted herein.

Furthermore, the plurality of secondary batteries 100 may be spaced a predetermined distance apart from each other. For example, when viewed from the F direction of FIG. 1, the plurality of secondary batteries 100 may be arranged in the front-rear direction and the horizontal direction.

Meanwhile, the terms indicating directions as used herein such as front, rear, left, right, upper and lower may change depending on the position of an observer or the shape of the stated element. However, for convenience of description, the front, rear, left, right, upper and lower directions are distinguished with respect to the viewing direction F.

Further, the plurality of secondary batteries 100 may be spaced, for example, 3 mm apart. Additionally, the plurality of secondary batteries 100 disposed in a row and the plurality of secondary batteries 100 disposed in a different row may be placed at different locations in the front-rear direction. Additionally, the plurality of secondary batteries 100 disposed in a column and the plurality of secondary batteries 100 disposed in a different column may be placed at different locations in the horizontal direction. That is, the plurality of secondary batteries 100 may be arranged in zigzag in the front, rear, left and right directions.

Additionally, the plurality of secondary batteries 100 may be electrically connected in series or in parallel by a busbar (not shown) including a conductive metal. The busbar may include, for example, at least one of copper, nickel or aluminum. For example, the busbar may have a wire shape. The busbar may be electrically connected between the positive electrode terminals 111 disposed on the secondary battery 100 and/or the negative electrode terminals 112 formed in the battery can.

Figure 3:
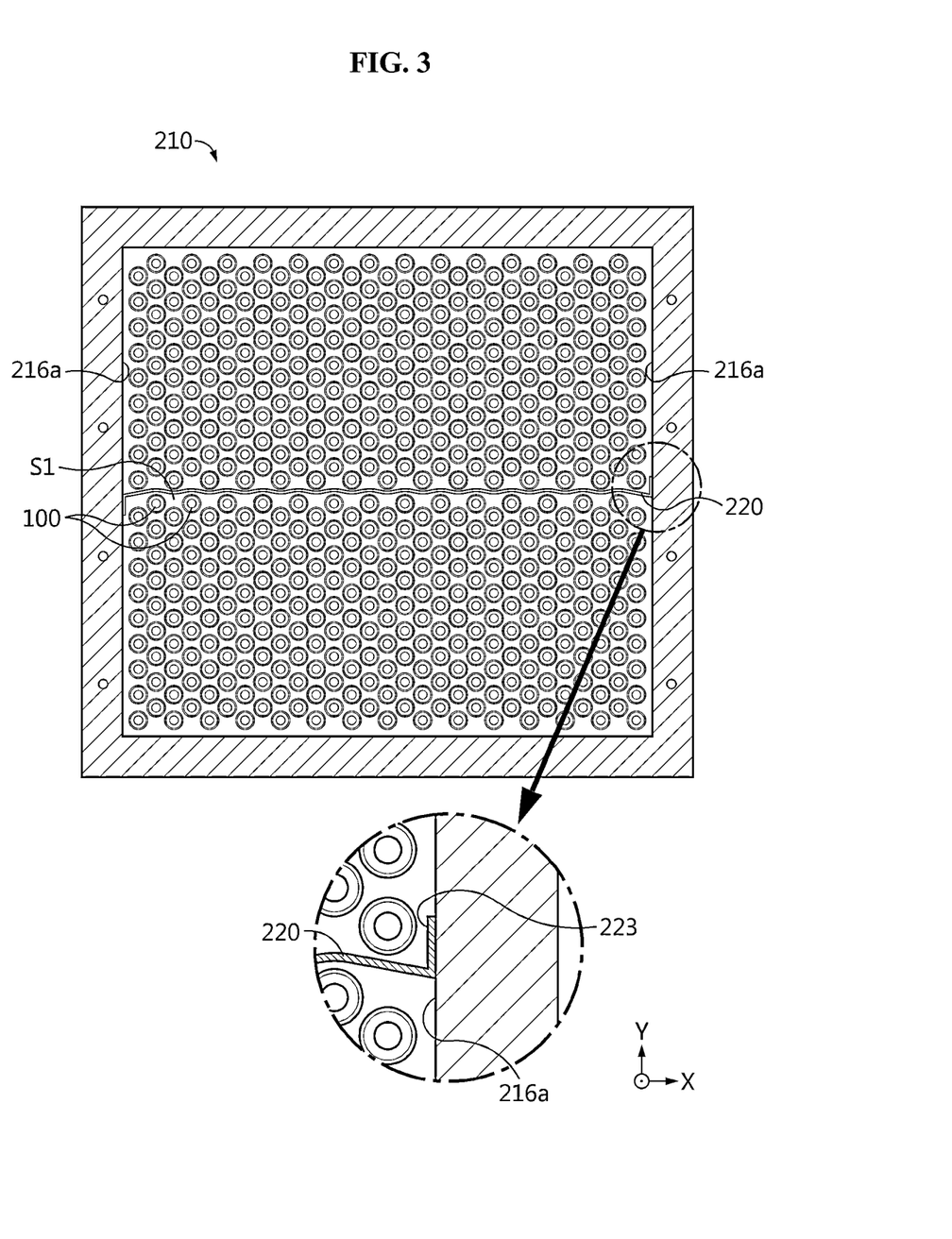
FIG. 3 is a schematic horizontal cross-sectional view of FIG. 1, taken along the line C-C'.

FIG. 3 is a schematic horizontal cross-sectional view of FIG. 1, taken along the line C-C'.

Referring to FIGS. 1 to 3, the module case 210 may have an internal space (not shown) in which the plurality of secondary batteries 100 is inserted and received. Specifically, the module case 210 may include a cover portion 212, a bottom portion 214 and a side portion 216 configured to form the internal space. The cover portion 212 may be a top wall of the module case 210. The bottom portion 214 may be a bottom wall of the module case 210. The side portion 216 may be a horizontal side wall of the module case 210. The plurality of secondary batteries 100 may be mounted on an upper surface 214a of the bottom portion 214.

Further, the module case 210 may include an electrically insulating plastic material. For example, the module case 210 may include poly vinyl chloride.

Furthermore, the module case 210 may include an upper case 217 and a lower case 218. The upper case 217 and the lower case 218 may be coupled with each other using a plurality of bolts T1. If necessary, the module case 210 may further include bushings (not shown) and nuts (not shown). For example, as shown in FIG. 1, 8 bolts T1 may be inserted into the left side and the right side to couple the upper case 217 and the lower case 218 of the module case 210. In this instance, the module case 210 may have coupling holes H2 having female threads to which the male threads of the bolts are coupled.

Additionally, the reinforcement member 220 may be disposed in the module case 210. The outer surface of the reinforcement member 220 may be fixed to the inner surface of the module case 210. Here, the reinforcement member 220 may be fixed to the module case 210 by a variety of methods, for example, welding and adhesion. The reinforcement member 220 may be a metal having a high mechanical strength. For example, the reinforcement member 220 may be stainless steel, steel or aluminum alloys.

In particular, the reinforcement member 220 may be fixed to each of the lower surface of the cover portion 212 and the upper surface of the bottom portion 214. For example, as shown in FIG. 2, the reinforcement member 220 may extend across the module case 210. The top of the reinforcement member 220 may be fixed to a lower surface 212a of the ceiling of the internal space in which the plurality of secondary batteries 100 of the cover portion 212 is received, and the bottom of the reinforcement member 220 may be fixed to the upper surface 214a of the bottom portion 214.

According to this configuration of the present disclosure, the present disclosure includes the reinforcement member 220 disposed in the module case 210 and fixed to the lower surface 212a of the ceiling of the internal space of the cover portion 212 and the upper surface of the bottom portion 214, thereby effectively preventing deformation of the module case 210 caused by vibration or external impacts. That is, since the reinforcement member 220 fixes the lower surface 212a of the ceiling of the internal space of the cover portion 212 of the module case 210 and the upper surface 214a of the bottom portion 214, it is possible to prevent deformation of the cover portion 212 and the bottom portion 214.

Accordingly, it is possible to reduce damage caused by frequent deformation of the module case 210 and prevent damage of the plurality of secondary batteries 100 mounted in the module case 210 or the internal components caused by vibration or external impacts.

Further, since the module case 210 of the present disclosure is not mechanically weak at the central part, it is easy to realize a large capacity battery module including the plurality of secondary batteries. Accordingly, it is possible to increase the energy density of the battery module 200 and reduce the number of components, thereby saving the manufacturing costs.

Figure 4:
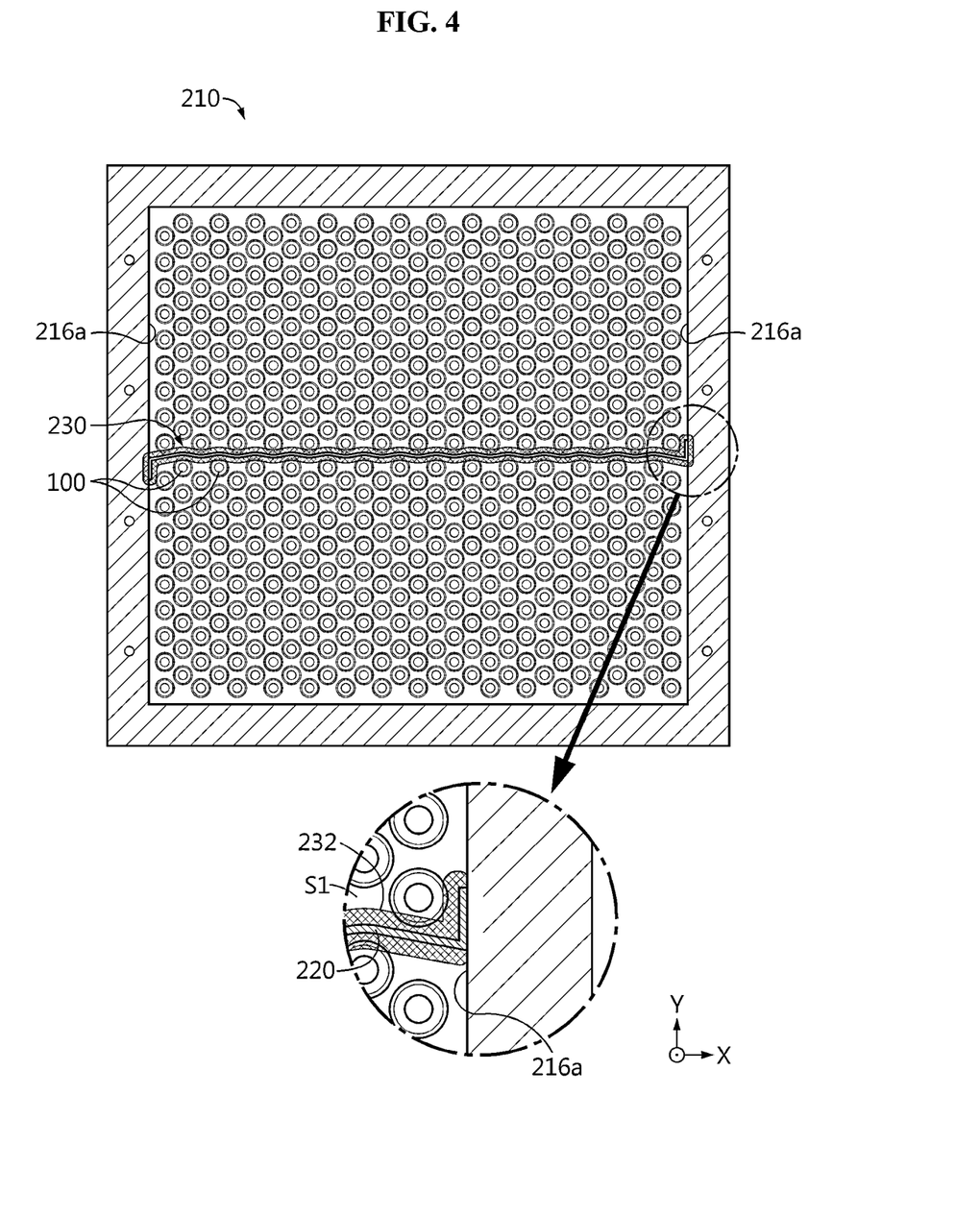
FIG. 4 is a schematic partial top view of components of a battery module according to another embodiment of the present disclosure.

FIG. 4 is a schematic partial top view of the components of a battery module according to another embodiment of the present disclosure.

Referring to FIG. 4 together with FIGS. 2 and 3, the battery module 200 of FIG. 4 may further include an adhesive member 230 added into the module case 210.

Specifically, the adhesive member 230 may be configured to fix the reinforcement member 220 to at least one of the lower surface 212a of the cover portion 212 of the module case 210, the upper surface 214a of the bottom portion 214 and an inner side surface 216a of the side portion 216.

For example, the adhesive member 230 may be configured to attach the reinforcement member 220 to each of the lower surface 212a of the ceiling of the internal space of the cover portion 212 of the module case 210 and the upper surface 214a of the bottom portion 214. Alternatively, the adhesive member 230 may be configured to attach the reinforcement member 220 to all the lower surface 212a of the cover portion 212 of the module case 210, the upper surface 214a of the bottom portion 214 and the inner side surface 216a of the side portion 216.

Specifically, the adhesive member 230 may be a solidified adhesive. The adhesive may have electrically insulating properties. The adhesive may be a glue or a hot-melt resin. For example, the adhesive may include at least one of a polyamide-based resin, a polyimide-based resin, an epoxy-based resin or an acrylic resin.

According to this configuration of the present disclosure, the present disclosure further includes the adhesive member 230 configured to fix the reinforcement member 220 to at least one of the lower surface 212a of the cover portion 212 of the module case 210, the upper surface 214a of the bottom portion 214 or the inner side surface 216a of the side portion 216, thereby easily performing the manufacturing process of fixing the reinforcement member 220 to the inner surface of the module case 210.

Referring back to FIGS. 2 and 3, the reinforcement member 220 may have a plate shape extending in the horizontal direction along the side portion 216 of the plurality of secondary batteries 100. For example, as shown in FIG. 2, at least part of the reinforcement member 220 may have a plate shape having a wider area in the front-rear direction than the area in the horizontal direction. That is, a part of the reinforcement member 220 may stand in the vertical direction. The reinforcement member 220 may extend in the horizontal direction. The height of the reinforcement member 220 may be equal to or larger than the height of the secondary battery 100. That is, the reinforcement member 220 may have such a size that the top of the reinforcement member 220 contacts the lower surface 212a of the cover portion 212 and the bottom of the reinforcement member 220 contacts the upper surface 214a of the bottom portion 214.

A spacing S1 may be formed between the plurality of secondary batteries 100. At least part of the reinforcement member 220 may have a curved shape B1 protruding toward the spacing S1 of the plurality of secondary batteries 100. For example, as shown in FIGS. 2 and 3, a part of the reinforcement member 220 may have the curved shape B1 protruding in an alternating manner in the front-rear direction toward the spacing S1 formed in the front-rear direction of the plurality of secondary batteries 100.

According to this configuration of the present disclosure, the reinforcement member 220 of the present disclosure has a plate shape extending in the horizontal direction along the side portion 216 of the plurality of secondary batteries 100, and at least part of the reinforcement member 220 has the curved shape B1 protruding toward the spacing S1 of the plurality of secondary batteries 100, thereby effectively reducing a dead space formed by the volume occupied by the reinforcement member 220. That is, the reinforcement member 220 may have a shape for maximum spatial utility considering the arrangement of the plurality of secondary batteries 100.

Referring back to FIG. 4 together with FIG. 3, the adhesive member 230 may include a protrusion 232 filled in the spacing S1 of the plurality of secondary batteries 100. The protrusion 232 may be formed by packing the adhesive member 230 into the spacing S1 of the plurality of secondary batteries 100 to increase the contact between the reinforcement member 220 and the upper surface 214a of the bottom portion 214 of the module case 210 and the lower surface 212a of the cover portion 212. That is, the protrusion 232 may protrude toward the spacing formed in the front-rear direction of the plurality of secondary batteries 100 from the adhesive member 230 coated on the outer surface of the reinforcement member 220.

According to this configuration of the present disclosure, the adhesive member 230 includes the protrusion 232 filled in the spacing of the plurality of secondary batteries 100, thereby fixing the reinforcement member 220 to the inner surface of the module case 210 with higher contact strength. Accordingly, it is possible to effectively prevent frequent deformation of the module case 210 caused by vibration or external impacts. Accordingly, it is possible to effectively enhance the durability of the battery module 200.

Referring back to FIG. 3 together with FIG. 2, the reinforcement member 220 may include a body portion 221 extending in a direction, and a bent portion 223 provided in each of two ends of the body portion 221. The bent portion 223 may be bent to come into contact with the inner surface of the module case 210. For example, as shown in FIG. 3, the bent portion 223 provided at the left end of the body portion 221 of the reinforcement member 220 may be bent forward. The bent portion 223 provided at the right end of the body portion 221 may be bent rearward. The reinforcement member 220 may suppress the deformation of the module case 210.

Referring back to FIG. 4 together with FIG. 2, the reinforcement member 220 according to another embodiment of the present disclosure may include the bent portion 223 attached to the inner side surface of the module case 210 by the adhesive member 230. For example, as shown in FIG. 4, the adhesive member 230 may be added to the outer surface of the bent portion 223 in contact with the inner side surface 216a of the side portion 216 of the module case 210. Accordingly, the outer surface of the bent portion 223 and the inner side surface 216a of the side portion 216 of the module case 210 may contact each other.

According to this configuration of the present disclosure, the present disclosure includes the bent portion 223 bent in contact with the inner side surface of the module case 210 at each of the two ends of the body portion 221 and attached to the inner side surface of the module case 210 by the adhesive member 230, thereby effectively increasing the contact area between the reinforcement member 220 and the inner side surface 216a of the side portion 216 of the module case 210. Accordingly, it is possible to effectively increase the fixing strength of the reinforcement member 220. Accordingly, the present disclosure may prevent the deformation of the module case 210 caused by external impacts with a higher fixing force.

Figure 5:
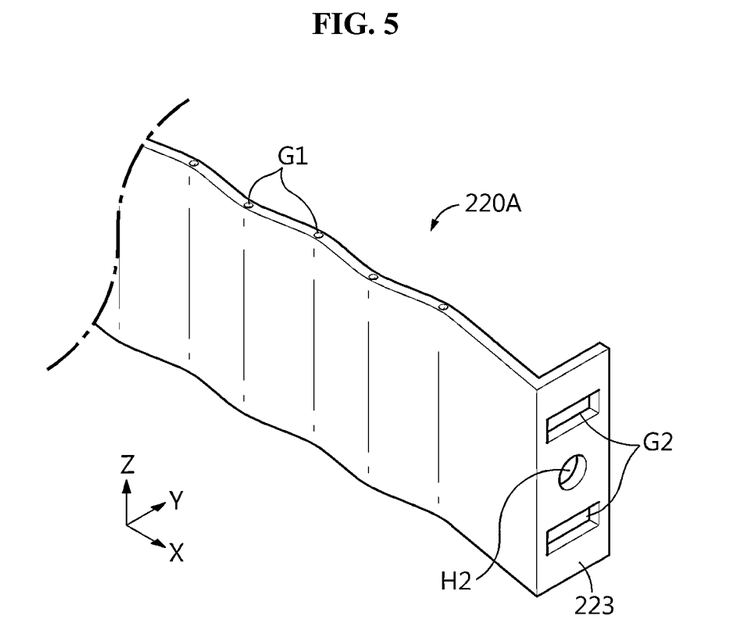
FIG. 5 is a schematic partial perspective view of a reinforcement member of a battery module according to another embodiment of the present disclosure.

FIG. 5 is a schematic partial perspective view of the reinforcement member of the battery module according to another embodiment of the present disclosure.

Referring to FIG. 5, the reinforcement member 220A of the battery module 200 according to another embodiment may have a receiving groove G1 and a coupling hole G2. Specifically, the receiving groove G1 may be recessed in the inward direction at a part of the body portion 221 and may be filled with the adhesive member 230. For example, the plurality of receiving grooves G1 may be formed at a predetermined interval on each of the top and bottom of the body portion 221.

Additionally, the coupling hole G2 may be formed in the outer surface of the bent portion 223. The coupling hole G2 may be open at a part of the bent portion 223 to accommodate a part of the adhesive member 230. For example, as shown in FIG. 5, 3 coupling holes G2 may be formed in the outer surface of the bent portion 223.

According to this configuration of the present disclosure, the reinforcement member 220A includes the receiving groove G1 recessed in the inward direction at a part of the body portion 221, so that the receiving groove G1 is filled with the adhesive member 230 and the coupling hole G2 which is open at a part of the bent portion 223 to accommodate the adhesive member 230, so an optimum amount of adhesive member 230 may be received in the receiving groove G1 and the coupling hole G2 of the reinforcement member 220A, thereby increasing the coupling strength with the lower surface 212a of the cover portion 212 of the module case 210, the upper surface 214a of the bottom portion 214, and the inner side surface 216a of the side portion 216. Accordingly, it is possible to effectively increase the durability of the battery module 200.

Figure 6:
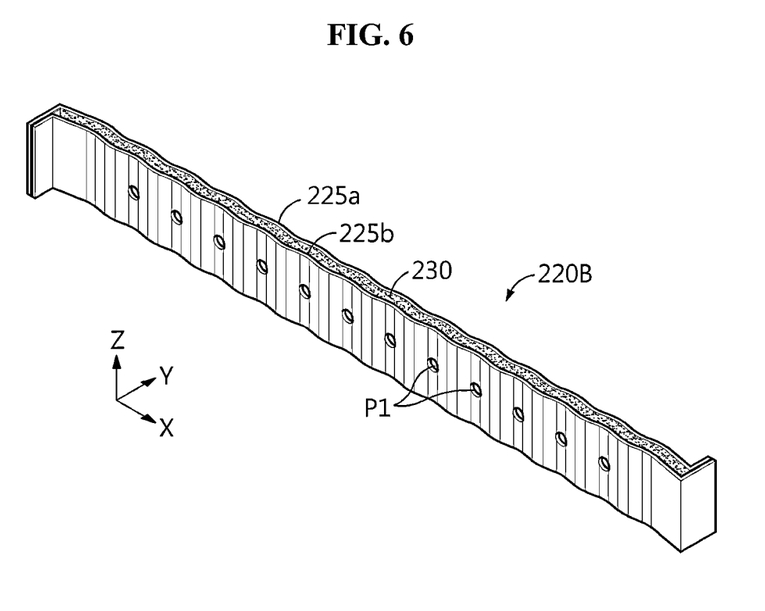
FIG. 6 is a schematic perspective view of a reinforcement member of a battery module according to still another embodiment of the present disclosure.

FIG. 6 is a schematic perspective view of the reinforcement member of the battery module according to still another embodiment of the present disclosure. Referring to FIG. 6, the reinforcement member 220B of the battery module according to still another embodiment may include a pair of plates 225a, 225b extending in a direction and spaced a predetermined distance apart from each other to form an internal space. The adhesive member 230 may be filled in between the pair of plates 225a, 225b. For example, as shown in FIG. 6, the reinforcement member 220B may include the pair of plates 225a, 225b extending in the horizontal direction. The pair of plates 225a, 225b may be spaced the predetermined distance apart from each other, and the spacing S1 may be filled with the adhesive member 230.

According to this configuration of the present disclosure, the reinforcement member 220B includes the pair of plates 225a, 225b, so a sufficient amount of adhesive member 230 may be filled in between the pair of plates 225a, 225b, thereby increasing the strength of the reinforcement member 220B, and by the reinforcement member 220B having the sufficient amount of adhesive member 230 therein, it is possible to increase the coupling strength to each of the lower surface 212a of the cover portion 212 of the module case 210 and the upper surface 214a of the bottom portion 214.

Additionally, each of the pair of plates 225a, 225b may have an opening P1 configured such that the internal space between the pair of plates 225a, 225b is in communication with the outside. The opening P1 may be formed through which the adhesive member 230 fills the spacing of the plurality of secondary batteries 100. That is, the opening P1 may be formed at a corresponding location to the spacing formed in the front-rear direction of the plurality of secondary batteries 100. Accordingly, a part of the adhesive member 230 filled between the pair of plates 225a, 225b may flow out of the spacing of the plurality of secondary batteries 100 through the opening P1.

According to this configuration of the present disclosure, the body portion 221 has the opening P1 configured such that the internal space between the pair of plates 225a, 225b is in communication with the outside, so an optimum amount of adhesive member 230 may be applied to the outer surface of the reinforcement member 220B, and the adhesive member 230 flowing out of the pair of plates 225a, 225b and the adhesive member 230 embedded between the pair of plates 225a, 225b may be kept connected. Accordingly, it is possible to effectively increase the coupling area between the reinforcement member 220B and the inner surface of the module case 210. Ultimately, the reinforcement member 220B may be coupled with the inner surface of the module case 210 with higher fixing strength, thereby effectively increasing the durability of the battery module 200.

Meanwhile, a battery pack (not shown) according to an embodiment of the present disclosure may include at least one battery module 200. Additionally, the battery pack may further include various types of devices (not shown) for controlling the charge/discharge of the battery module 200, for example, a Battery Management System (BMS), a current sensor and a fuse.

Meanwhile, an electronic device (not shown) according to an embodiment of the present disclosure includes at last one battery module 200. The electronic device may further include a device housing (not shown) having a receiving space for receiving the battery module 200 and a display unit to allow a user to see the state of charge of the battery module 200.

Additionally, the battery pack according to an embodiment of the present disclosure may be included in a vehicle such as an electric vehicle or a hybrid electric vehicle. That is, the vehicle according to an embodiment of the present disclosure may include the battery pack including at least one battery module 200 according to an embodiment of the present disclosure mounted in the vehicle body.

Meanwhile, the terms indicating directions as used herein such as upper, lower, left, right, front and rear are used for convenience of description only, and it is obvious to those skilled in the art that the term may change depending on the position of the stated element or an observer.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

[Description of Reference Numerals]

| 200: Battery module | 220: Reinforcement member |
|---|---|
| 221, 223: Body portion, Bent portion | |
| 100: Secondary battery | |
| 210: Module case | |
| 212, 214, 216: Cover portion, Bottom portion, Side portion | |
| 230: Adhesive member | 232: Protrusion |

[Description of Reference Numerals]

| B1: Curved shape | G1, G2: Receiving groove, Coupling hole |
|---|---|
| S1: Spacing | |
| 225a, 225b: Plates | P1: Opening |

What is claimed is:

1. A battery module, comprising:
    a plurality of secondary batteries arranged in at least one direction;
    a module case including a cover portion, a bottom portion, and a side portion to define an internal space in which the plurality of secondary batteries is disposed;
    a reinforcement member disposed in the module case and fixed to a lower surface of the cover portion and an upper surface of the bottom portion, and
    an adhesive member configured to fix the reinforcement member to at least one of the lower surface of the cover portion of the module case, the upper surface of the bottom portion, and an inner surface of the side portion,
    wherein the reinforcement member includes:
        a body portion extending in a direction; and
        a bent portion bent in contact with an inner side surface of the module case at each of two ends of the body portion and attached to the inner side surface of the module case by the adhesive member, and
    wherein the reinforcement member includes:
        a receiving groove recessed in an inward direction at a part of the body portion in which the adhesive member is filled; and
        a coupling hole that is open at a part of the bent portion to accommodate the adhesive member.

2. The battery module according to claim 1, wherein the plurality of secondary batteries is spaced apart a predetermined distance from each other, and
    wherein the reinforcement member has a plate shape extending in a horizontal direction along the side of the plurality of secondary batteries, and at least part of the reinforcement member has a curved shape protruding toward a spacing of the plurality of secondary batteries.

3. The battery module according to claim 2, wherein the adhesive member includes a protrusion filled in the spacing of the plurality of secondary batteries.

4. The battery module according to claim 1, wherein the reinforcement member includes a pair of plates extending in a direction and spaced apart from each other to define an internal space between the pair of plates, and
    wherein the adhesive member is filled in between the pair of plates.

5. The battery module according to claim 4, wherein each of the pair of plates has an opening such that the internal space between the pair of plates is in communication with outside.

6. A battery pack comprising at least one battery module according to claim 1.

7. A vehicle comprising the battery pack according to claim 6.

8. The battery module according to claim 2, wherein the curved shape has an alternating curved shape protruding toward a spacing of the plurality of secondary batteries in correspondence with the sides of the plurality of secondary batteries.

* * * * *